(12) United States Patent
Myers (10) Patent No.: US 9,726,961 B2
(45) Date of Patent: Aug. 8, 2017

(54) CAMERA MOUNTING SYSTEM

(71) Applicant: Gary Andrew Myers, Chandler, AZ (US)

(72) Inventor: Gary Andrew Myers, Chandler, AZ (US)

( * ) Notice: Subject to any disclaimer, the term of this patent is extended or adjusted under 35 U.S.C. 154(b) by 0 days.

(21) Appl. No.: 15/092,495

(22) Filed: Apr. 6, 2016

(65) Prior Publication Data
US 2016/0342073 A1 Nov. 24, 2016

Related U.S. Application Data

(60) Provisional application No. 62/143,551, filed on Apr. 6, 2015.

(51) Int. Cl.
| | |
|---|---|
| *G03B 17/56* | (2006.01) |
| *F16M 11/04* | (2006.01) |
| *F16M 11/14* | (2006.01) |
| *F16M 11/16* | (2006.01) |
| *F16M 11/24* | (2006.01) |
| *F16M 13/00* | (2006.01) |

(52) U.S. Cl.
CPC ......... *G03B 17/561* (2013.01); *F16M 11/041* (2013.01); *F16M 11/045* (2013.01); *F16M 11/14* (2013.01); *F16M 11/16* (2013.01); *F16M 11/242* (2013.01); *F16M 13/00* (2013.01)

(58) Field of Classification Search
None
See application file for complete search history.

(56) References Cited

U.S. PATENT DOCUMENTS

| | | | | | |
|---|---|---|---|---|---|
| 2,332,504 | A * | 10/1943 | Brenner | ................. | F16M 11/12 248/181.1 |
| 2,599,269 | A * | 6/1952 | Markle | ................. | F16M 11/20 248/404 |
| 2,956,764 | A * | 10/1960 | Nakatani | ............... | F16M 11/28 248/183.4 |
| 4,030,114 | A * | 6/1977 | Telfer | .................... | F16M 11/00 248/159 |
| 6,663,299 | B1 * | 12/2003 | Shupak | ................. | G03B 17/00 396/28 |
| 6,729,778 | B1 * | 5/2004 | Wu | ........................ | F16M 11/14 248/181.1 |
| 8,616,789 | B1 * | 12/2013 | Hutchison | ............ | F16M 11/048 396/428 |
| 8,678,680 | B1 * | 3/2014 | Pelini | ..................... | F16M 11/06 224/275 |
| 2010/0005636 | A1 * | 1/2010 | Liao | ........................ | A42B 3/04 24/652 |
| 2010/0226641 | A1 * | 9/2010 | Lowen | ................... | F16M 11/10 396/419 |

(Continued)

*Primary Examiner* — W B Perkey
(74) *Attorney, Agent, or Firm* — Schmeiser, Olsen & Watts LLP (57) ABSTRACT

A camera mounting system is provided. The camera mounting system includes a manifold member coupled to a camera mount device, such as a tripod. One or more rods may be coupled to the manifold member. The one or more rods provide a support structure to mount one or more of a camera, photography equipment, and audio equipment. The system may further include a ball joint and a clamp wherein the ball joint and the clamp operate to couple an additional rod to an end of a rod coupled to the manifold member.

2 Claims, 8 Drawing Sheets

(56) References Cited

U.S. PATENT DOCUMENTS

2011/0123188 A1\* 5/2011 Cardwell ............... F16M 11/18
396/428
2015/0253650 A1\* 9/2015 Huang ................. F16M 13/022
348/376

\* cited by examiner

CAMERA MOUNTING SYSTEM

CROSS REFERENCE TO RELATED APPLICATION[S]

This application claims priority to U.S. Provisional Patent Application entitled "CAMERA MOUNTING SYSTEM," Ser. No. 62/143,551, filed Apr. 6, 2015, the disclosure of which is hereby incorporated entirely herein by reference.

BACKGROUND OF THE INVENTION

Technical Field

This invention relates generally to a camera mounting system and more particularly to a modular mounting system to mount cameras and photography equipment thereto.

State of the Art

The desire to utilize cameras to capture still images and video is advancing within every industry. With digital photography and videography becoming more readily available, the same camera is often used to capture high quality still images and high definition video. Even high definition audio is becoming more available for users to capture with smaller equipment becoming more available.

Currently, in order to capture multiple angles and views separate systems must be setup in order to shoot a scene from all desired angles at the same time. Also, it requires various operators of each camera to operate the camera. This becomes costly and difficult to transport all of the equipment needed to capture the desired shots.

Accordingly, there is a need for an improved camera mounting system that provides the ability to configure the system to capture all desired shots and mount all needed equipment thereto.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2D is a side view of a bottom portion of a two piece manifold member;

DETAILED DESCRIPTION OF EMBODIMENTS OF THE INVENTION

As discussed above, embodiments of the present invention relate to a camera mounting system. Generally, a camera mounting system in accordance with embodiments comprises a manifold member, wherein one or more rods may be coupled thereto. The rods operate as a base onto which cameras photography equipment may be attached to.

Figure 1:
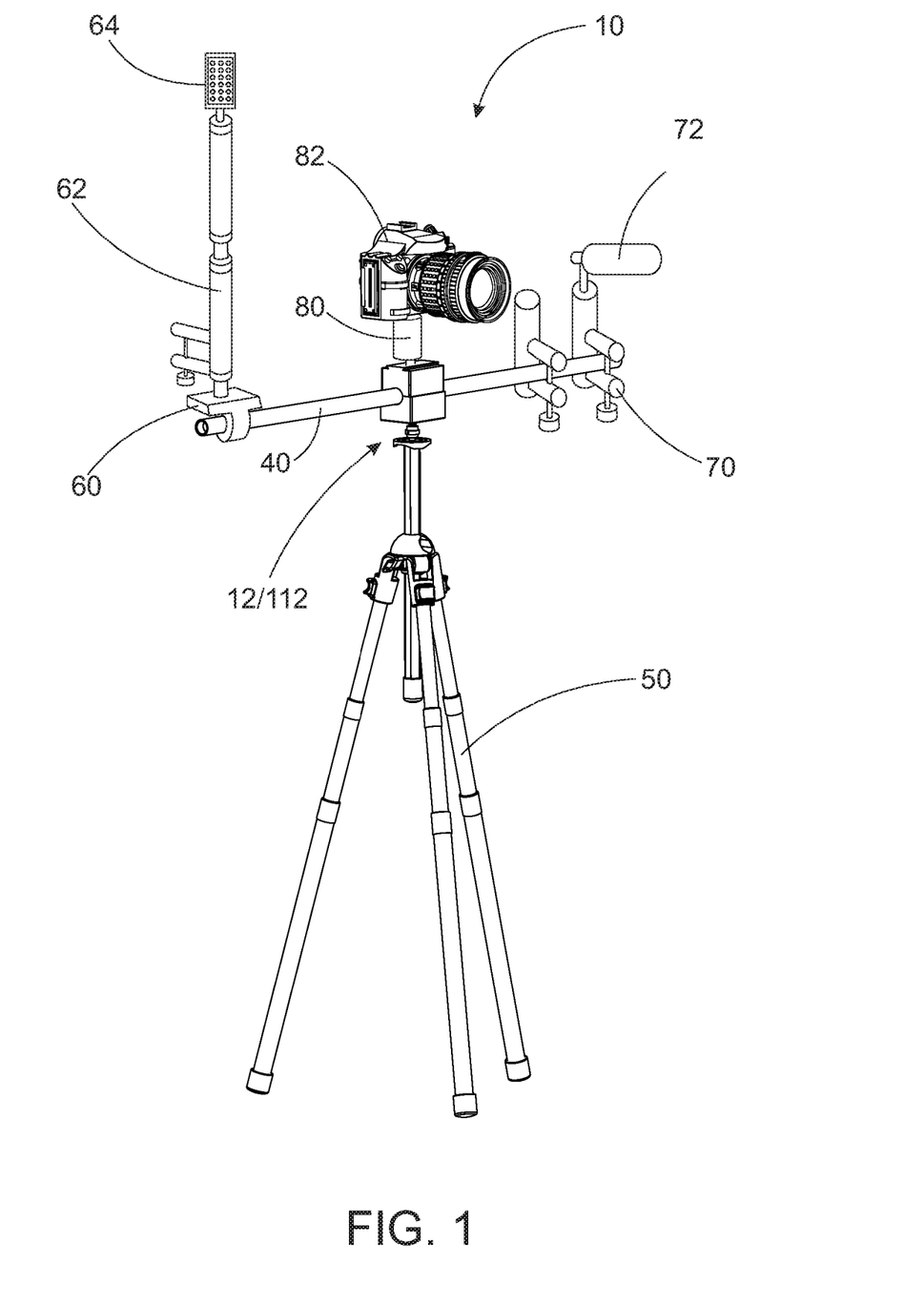
FIG. 1 is a perspective view a camera mounting system with a camera and other photography equipment mounted to the system.
Figure 2A:
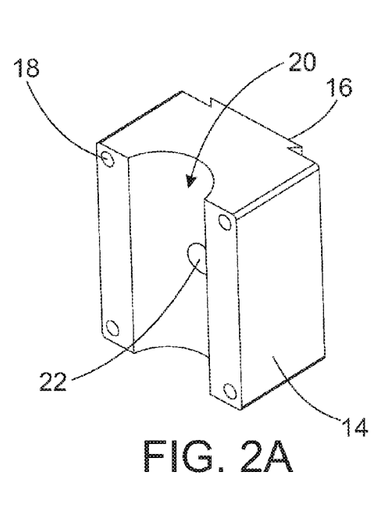
FIG. 2A is a perspective view of a bottom portion of a two piece manifold member.
Figure 2B:
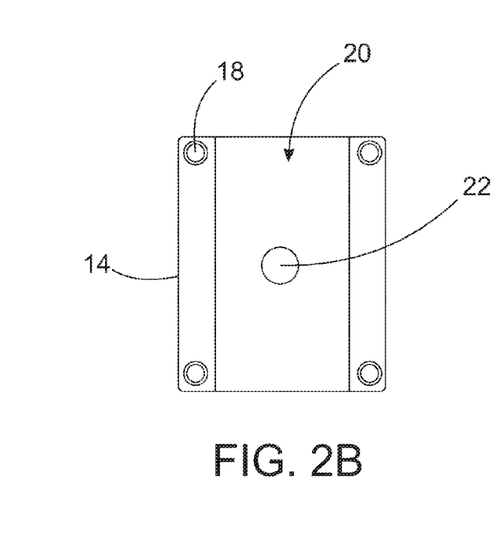
FIG. 2B is a bottom view of a bottom portion of a two piece manifold member.
Figure 2C:
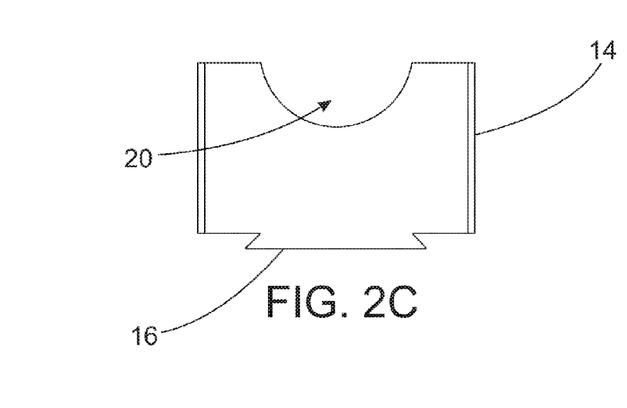
FIG. 2C is a front view of a bottom portion of a two piece manifold member.
Figure 3A:
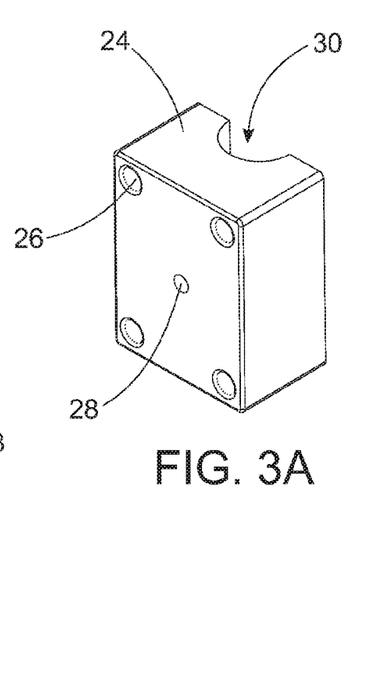
FIG. 3A is a perspective view of a two piece manifold member.
Figure 3B:
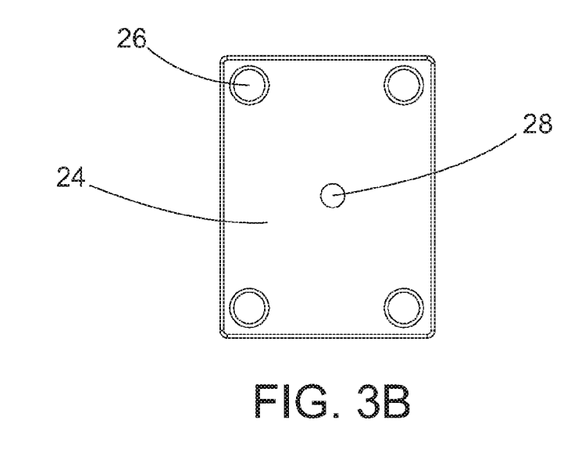
FIG. 3B is a top view of a two piece manifold member.
Figure 3C:
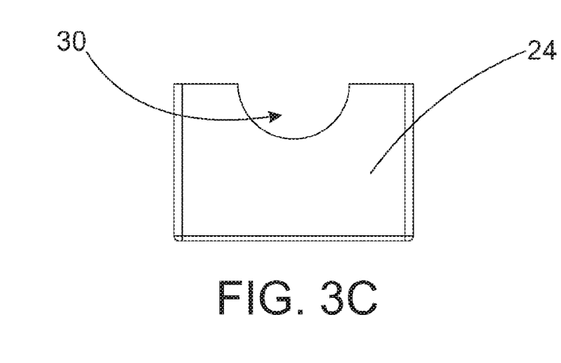
FIG. 3C is a front view of a two piece manifold member.
Figure 3D:
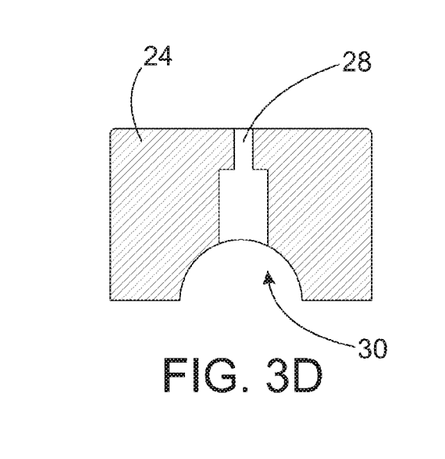
FIG. 3D is a section view of a two piece manifold member.
Figures 7A, 7C, 7D, 7F, 7G:
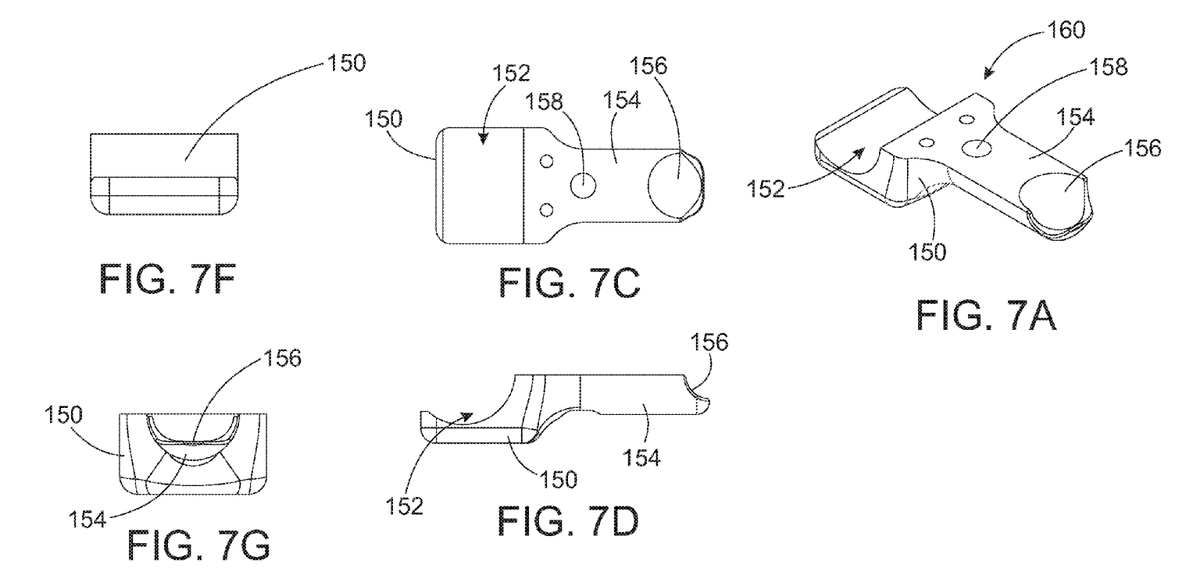
FIG. 7A is a perspective view of an active member of a clamp for use with the ball joint of FIGS. 5A-5F.
FIG. 7C is a top view of an active member of a clamp for use with the ball joint of FIGS. 5A-5F.
FIG. 7D is a side view of an active member of a clamp for use with the ball joint of FIGS. 5A-5F.
FIG. 7F is a front view of an active member of a clamp for use with the ball joint of FIGS. 5A-5F.
FIG. 7G is a rear view of an active member of a clamp for use with the ball joint of FIGS. 5A-5F.
Figures 7B, 7E, 7H:
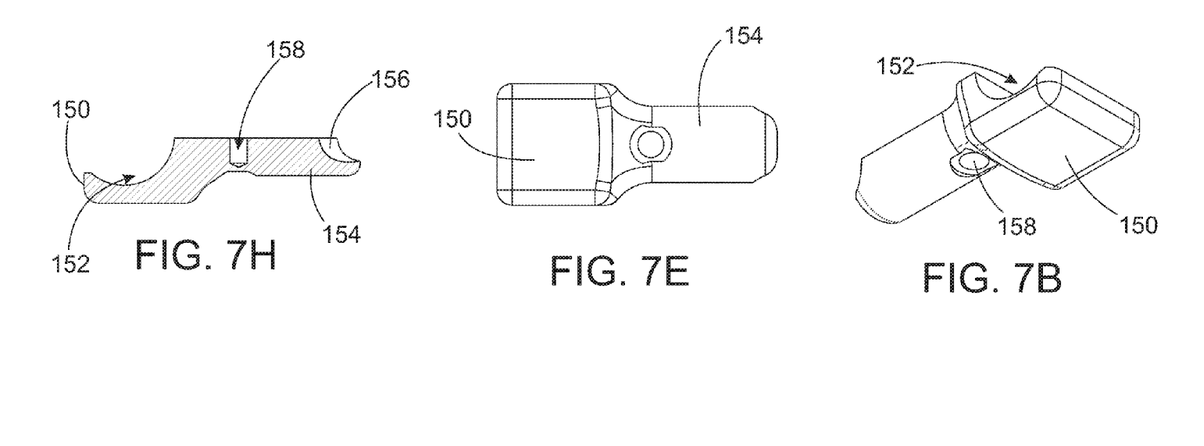
FIG. 7B is a perspective view of an active member of a clamp for use with the ball joint of FIGS. 5A-5F.
FIG. 7E is a bottom view of an active member of a clamp for use with the ball joint of FIGS. 5A-5F.
FIG. 7H is a perspective view of an active member of a clamp for use with the ball joint of FIGS. 5A-5F.
Figure 8A:
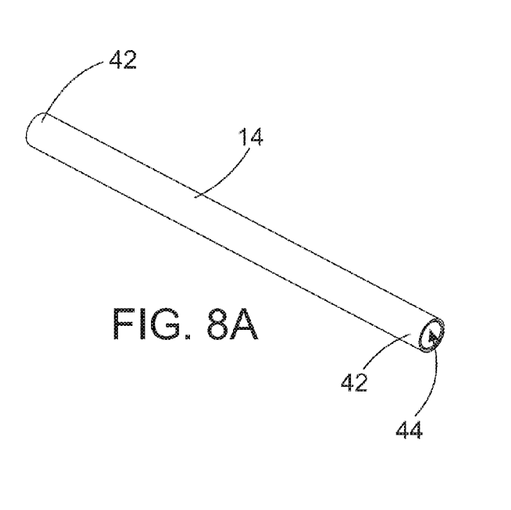
FIG. 8A is a perspective view of a rod for use with a camera mounting system.
Figure 8B:
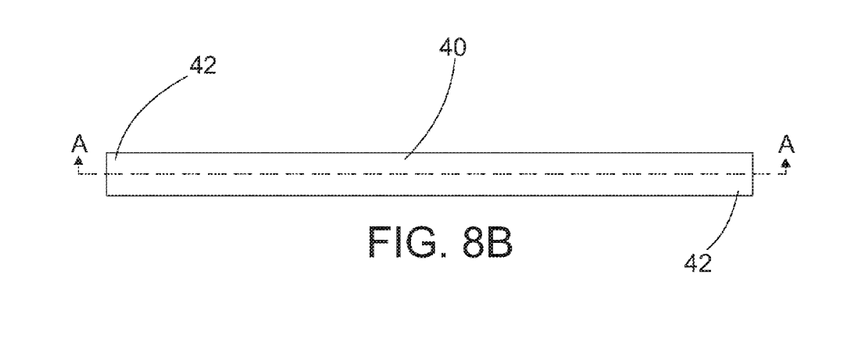
FIG. 8B is a side view of a rod for use with a camera mounting system.
Figure 8C:
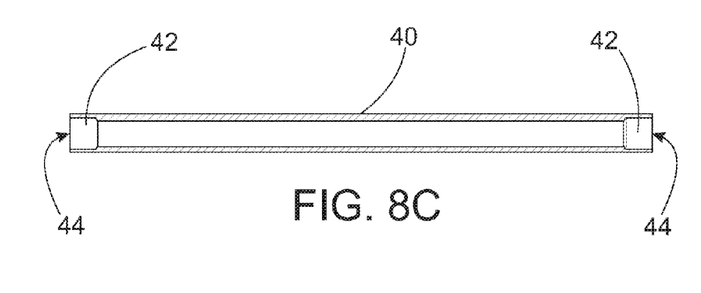
FIG. 8C is a section view of a rod for use with a camera mounting system.
Figure 8D:
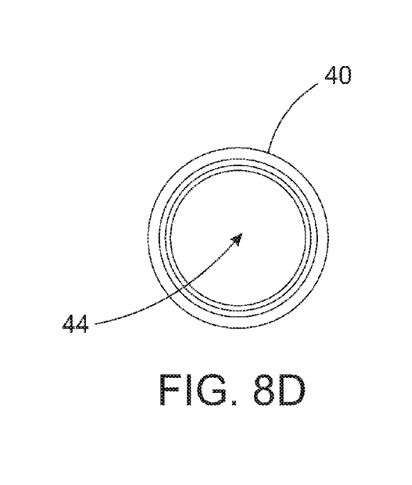
FIG. 8D is a front view of a rod for use with a camera mounting system.

FIG. 1 depicts a camera mounting system 10 according to embodiments. Camera mounting system comprises a manifold member 12 mountable to a tripod 14. It will be understood that the manifold member 12 may be mounted to a quick release clamp for use with the tripod 50. Further, other embodiments of a manifold member 12 may be coupled to standard mounting screws of tripods. The system 10 also comprises a rod 40 coupled to the manifold member 12, a ball joint 130 (see FIG. 5), and a clamp (See FIGS. 6 and 7).

With additional reference to FIGS. 2A-3D, the manifold block 12 may include a base portion 14 and a top portion 24. The base portion 14 may include apertures 18 for coupling the top portion 24 to the base portion 14, a quick release protrusion 16, a channel 20 and a mounting aperture 22 extending between the channel 22 and the quick release protrusion 16. The top portion may include a apertures 26 for coupling the top portion 24 to the base portion 14, a mounting aperture 28 and a channel 30.

The top portion 24 may be coupled to the base portion 14 with connectors that engage apertures 26 and 18 of the top and base portions 24 and 14 respectively. Coupling the top portion 24 to the base portion 14 results in the channel 30 and the channel 20 to align to form and aperture. The channel 30 and the channel 20 operate to clamp the rod 40 between the channel 30 and the channel 20. This clamping action retains the rod in a stationary position until a user decouples the top portion 24 from the base portion 14. The quick release protrusion 16 allows the base portion 14 to be coupled to a quick release mounting clamp that is coupled to the tripod 50. The quick release mounting clamp corresponds to the protrusion and clamps to the protrusion. This allows for a quick release mechanism of the quick release clamp to move between an engaged and disengaged position easily to retain and release the protrusion 16 quickly. The mounting aperture 22 of the base portion 14 allows the base portion 14 to be coupled directly to a mounting screw of the tripod 50.

Upon mounting the base portion 14 to the tripod 50 and retaining the rod between the top portion 24 and the base portion 14, the system is in a configuration to allow mounting of a camera and other photography equipment. Referring to FIG. 1 for example, and without limitation, a clamp 60 may be clamped to the rod 40, wherein extension rods 62 may be coupled to the clamp 60 and a flash 64 is coupled to the extension rods. A clamp 70 may be coupled to the rod 40, wherein a microphone 72 is coupled to the clamp 70. A camera rotational device 80 may be coupled to manifold member 12 and a camera 82 may be coupled to the rotational device 80 to allow for fine adjustment in directing the camera 82 to an intended target. It will be understood that the any number of cameras and photography equipment can be coupled to the mounting system 10.

Figure 4A:
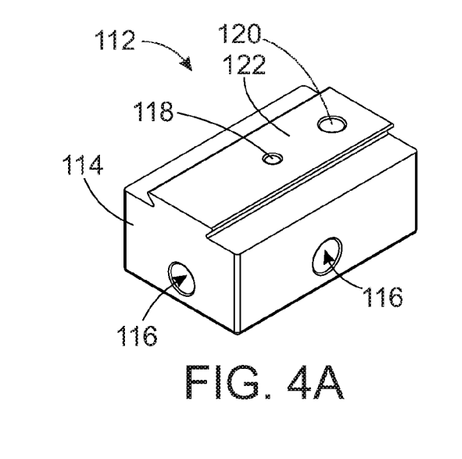
FIG. 4A is a perspective view of a manifold member.
Figure 4B:
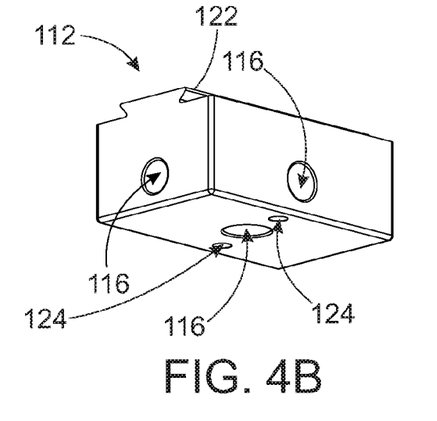
FIG. 4B is a perspective view of a manifold member.
Figure 4C:
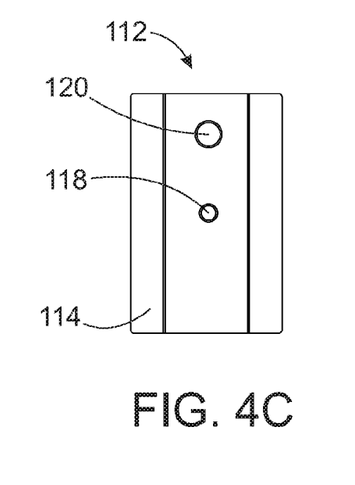
FIG. 4C is a top view of a manifold member.
Figure 4D:
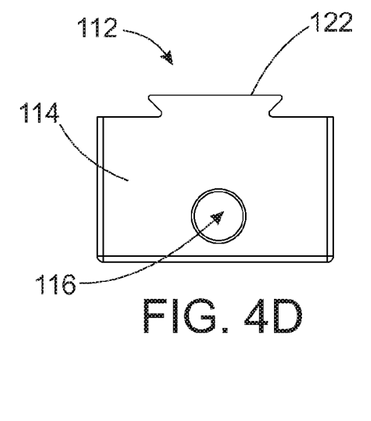
FIG. 4D is a front view of a manifold member.
Figure 4E:
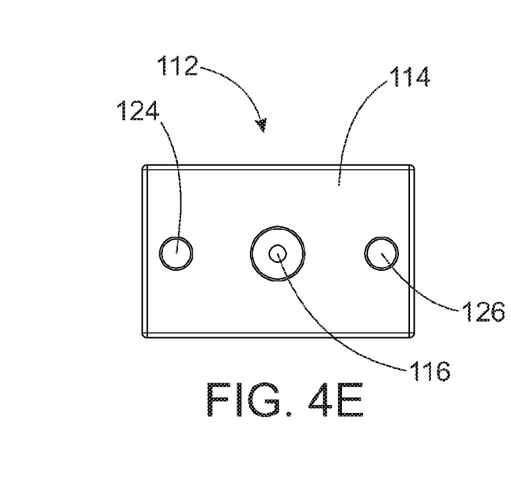
FIG. 4E is a bottom view of a manifold member.
Figure 4F:
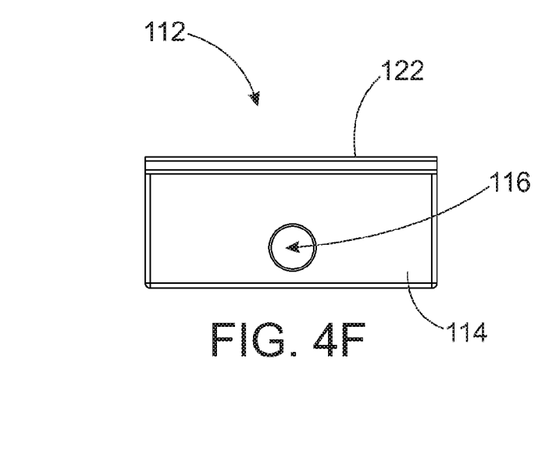
FIG. 4F is a side view of a manifold member.
Figure 5A:
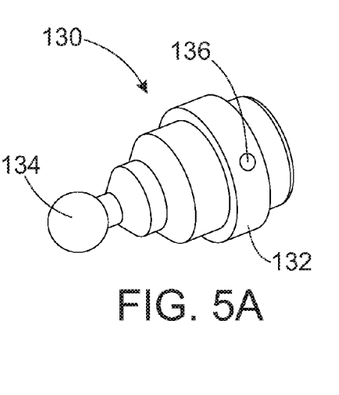
FIG. 5A is a perspective view of a ball joint of a camera mounting system.
Figure 5B:
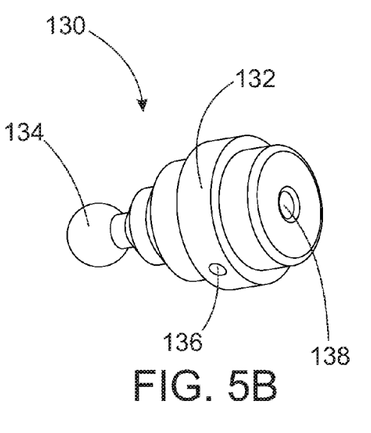
FIG. 5B is a perspective view of a ball joint of a camera mounting system.
Figure 5C:
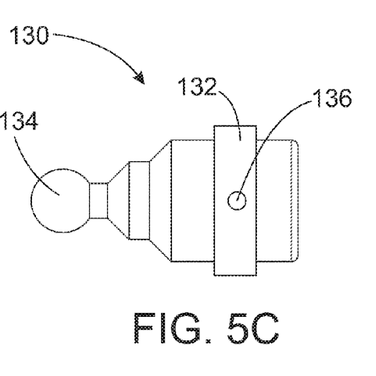
FIG. 5C is a side view of a ball joint of a camera mounting system.
Figure 5D:
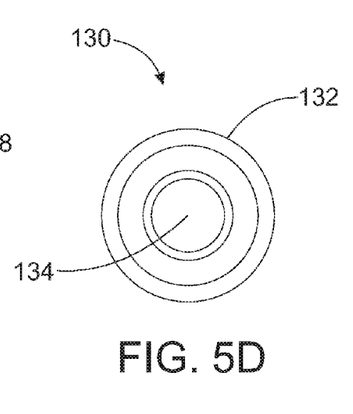
FIG. 5D is a top view of a ball joint of a camera mounting system.
Figure 5E:
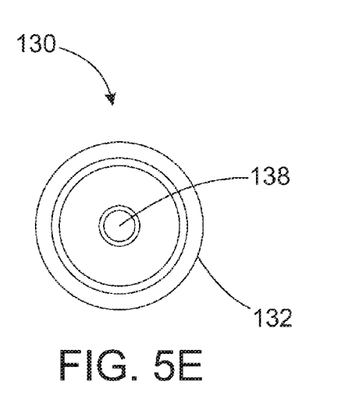
FIG. 5E is a bottom view of a ball joint of a camera mounting system.
Figure 5F:
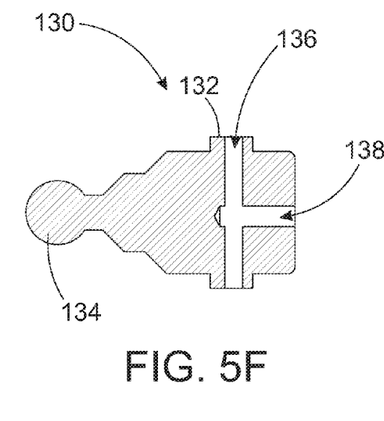
FIG. 5F is a section view of a ball joint of a camera mounting system.
Figure 6A:
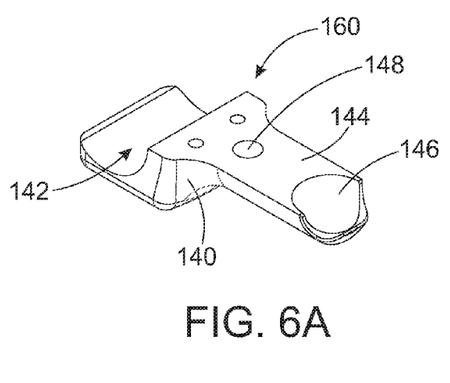
FIG. 6A is a perspective view of a stationary member of a clamp for use with the ball joint of FIGS. 5A-5F.
Figure 6B:
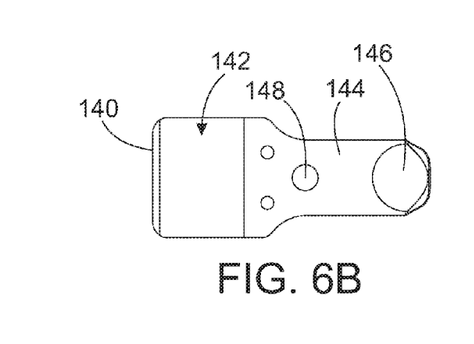
FIG. 6B is a top view of a stationary member of a clamp for use with the ball joint of FIGS. 5A-5F.
Figure 6C:
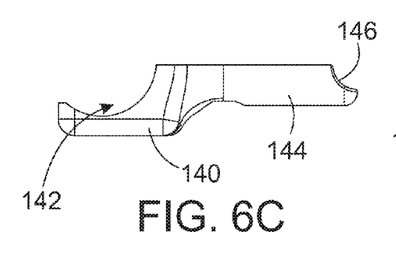
FIG. 6C is a side view of a stationary member of a clamp for use with the ball joint of FIGS. 5A-5F.
Figure 6D:
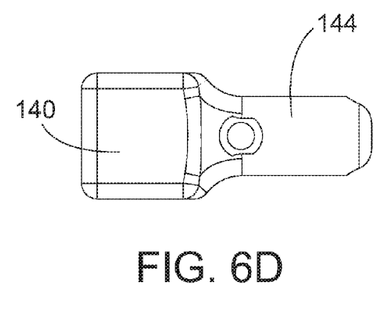
FIG. 6D is a bottom view of a stationary member of a clamp for use with the ball joint of FIGS. 5A-5F.
Figure 6E:
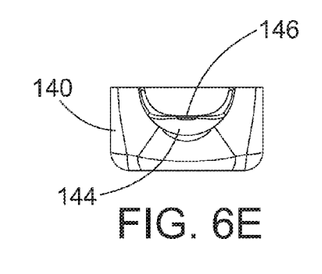
FIG. 6E is a rear view of a stationary member of a clamp for use with the ball joint of FIGS. 5A-5F.
Figure 6F:
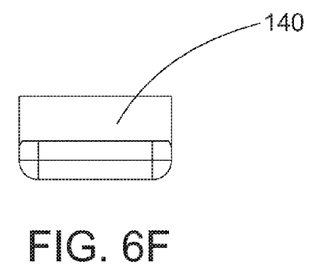
FIG. 6F is a front view of a stationary member of a clamp for use with the ball joint of FIGS. 5A-5F.
Figure 6G:
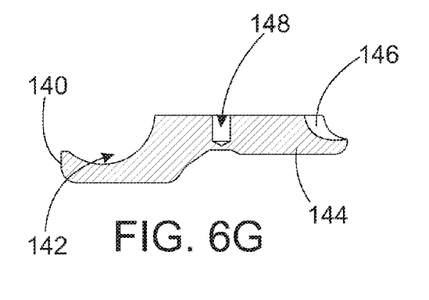
FIG. 6G is a section view of a stationary member of a clamp for use with the ball joint of FIGS. 5A-5F.

In other embodiments, and referring to FIGS. 4A-4C, another manifold member 112 is contemplated. Manifold member 112 includes a body 114 that is cube shaped. The manifold member may include an aperture 116 in each face of the cube with exception of the bottom face. The bottom face includes a quick release protrusion 122 extending therefrom. Mounting apertures 118 and 120 are located on protrusion 122, the mounting apertures configured to mount to common sized mounting screws of a tripod. For example and without limitation, mounting aperture 118 may be a ¼-20 through threaded hole and mounting aperture 120 may be a ¾-16 through threaded hole. The quick release protrusion 122 allows the body 114 to be coupled to a quick release mounting clamp that is coupled to the tripod 50. The quick release mounting clamp corresponds to the protrusion 122 and clamps to the protrusion 122. This allows for a quick release mechanism of the quick release clamp to move between an engaged and disengaged position easily to retain and release the protrusion 122 quickly. A top face of the body 114 may include apertures 124 and 126 for mounting to other types of cameras and/or equipment.

The apertures 116 in the faces of the body 114 operate to receive and retain a rod 40 within any or all of the apertures 116. In other words, the body 14 may receive and retain 1 to 5 rods 40. Upon mounting the manifold member 112 to the tripod 50 and retaining the rod(s) 40 in the aperture(s) 116, the system 10 is in a configuration to allow mounting of a camera and other photography equipment. Referring to FIG. 1 for example, and without limitation, a clamp 60 may be clamped to the rod 40, wherein extension rods 62 may be coupled to the clamp 60 and a flash 64 is coupled to the extension rods. A clamp 70 may be coupled to the rod 40, wherein a microphone 72 is coupled to the clamp 70. A camera rotational device 80 may be coupled to manifold member 12 and a camera 82 may be coupled to the rotational device 80 to allow for fine adjustment in directing the camera 82 to an intended target. It will be understood that the any number of cameras and photography equipment can be coupled to the mounting system 10.

With further reference to FIGS. 5A-8D, additional rods 40 may be coupled to the system by use of ball joints 130 and clamp 160. The ball joint 130 may include a base portion 132, a ball portion 134 and mounting apertures 136 and 138. The ball joint 130 may be coupled to an end 42 of a rod 40 by the base portion 132, wherein the base portion 132 is coupled within a recess 44 in end 42 of the rod 40. This may be accomplished by use of a threaded engagement between the base portion 132 and the rod 40. The ball 134 is then extending from the end of rod 40. A clamp 160 formed of a stationary member 140 and an active member 150 may be coupled together to clamp to the ball joint 130 and also hold another rod 40. The stationary member 140 includes a channel 142, an extended portion 144 with a ball recess 146 and a mounting aperture 148. The active member 150 includes a channel 152, an extended portion 154 with a ball recess 156 and a mounting aperture 158. Mounting aperture 158 may include an opening for a connector to extend through and engage an outer surface and then engage threads of the mounting aperture 148 of the stationary member 140.

The coupling of the active member 150 to the stationary member 140 operates to clamp a ball 132 of the ball joint 130 between the ball recess 146 and ball recess 156. The coupling comprises enough friction to actively retain the clamp 160 in various orientations as the ball recesses 146 and 156 allow for rotation about the ball 130. In other words, the ball recesses 146 and 156 form a socket to create a ball and socket joint with the ball 132 of the ball joint 130.

The coupling of the active member 150 to the stationary member 140 operates to align the channels 152 and 142 to form a recess that receives and retains a rod 40. The coupling of the clamp 160 to the ball joint 130 and retaining a rod 40 allows for the clamp 160 and ball joint 130 to orient the rod in virtually any direction and configuration to mount additional cameras and/or photography equipment. These allow for full customization in mounting a plurality of cameras to a single tripod 50 and orient them to take different angled shots and allow production quality shots with a single device. It allows for operation of multiple cameras at the same time to capture all angles of a desired shot and then choose the best shot in post processing. It provides the ability to a user to capture all the desired shots without the cost and expense of having multiple camera setups and multiple crewmembers operating the cameras. A single person can operate all of the cameras and the user can orient all of the desired cameras to capture the scene from all desired camera angles with the desired lighting and sound recording capabilities. All of the components of the system 10 may be disassembled and easily stored and transported in conventional camera bags for ease of transportation.

When not in use, the ball portion 134 of the ball joint 130 may be inserted within the recess 44 of the end 42 of the rod 40 and the ball joint 130 coupled to the end 42 of the rod 40. This may be accomplished through a threaded engagement. This places the ball joint 130 in an inoperable position. Additionally, the ball portion 134 of the ball joint 130 may be inserted within apertures 116 of manifold member 112 and the ball joint coupled to the aperture 116 of the manifold member 112 to hold the ball joint 130 in an inoperable position.

Accordingly, the components defining any camera mounting system may be formed of any of many different types of materials or combinations thereof that can readily be formed into shaped objects provided that the components selected are consistent with the intended operation of a camera mounting system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any camera mounting system may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A camera mounting system comprising:
   a manifold member coupled to a camera mount device; and
   a rod coupled to the manifold member, wherein the rod is a support structure to mount one or more of a camera, photography equipment, and audio equipment, wherein the manifold member is a block shape and comprises:
   a base portion having a quick release protrusion and a channel;
   a top portion coupled to the base portion, the top portion having a mounting aperture and a channel, wherein the channel of the base portion and the channel of the top portion operate to clamp the rod between the channel of the base portion and the channel of the top portion;
   the quick release protrusion of the base portion is coupled to a quick release mounting clamp coupled to a tripod; and
   a camera mounted to the manifold member using the mounting aperture of the top portion.

2. The system of claim 1, further comprising a ball joint and a clamp wherein the ball joint and the clamp operate to couple an additional rod to an end of the rod coupled to the manifold member.

* * * * *